ARTICULATED VEHICLE

Original Filed Dec. 19, 1966 3 Sheets-Sheet 1

Fig. 4a. STRAIGHT

Fig. 4b. LEFT TURN

Fig. 4d. STEERING CHECKED

ENTERING A RIGHT TURN

FULL RIGHT TURN

United States Patent Office

Re. 26,802
Reissued Feb. 24, 1970

26,802
ARTICULATED VEHICLE

Robert C. Symons and John H. Boyd, Woodstock, Ontario, Canada, assignors to Timberjack Machines Limited, Woodstock, Ontario, Canada Original No. 3,385,389, dated May 28, 1968, Ser. No. 603,011, Dec. 19, 1966. Application for reissue Sept. 27, 1968, Ser. No. 765,706
Int. Cl. B62d *5/00*
U.S. Cl. 180—79.2 7 Claims

Matter enclosed in heavy brackets [ ] appears in the original patent but forms no part of this reissue specification; matter printed in italics indicates the additions made by reissue.

ABSTRACT OF THE DISCLOSURE

A steering cushioning device for an articulated vehicle steered by a hydraulic cylinder that avoids shock as the two vehicle frames reach the steering limits. The angle between frame center-lines is sensed by one or other of a pair of slidable rods mounted on one frame and projecting into engagement with the other frame. Rod movement is transmitted to a control valve to stop further steering action.

This invention relates to improvements in articulated-type vehicles, that is to say vehicles formed of two frames each mounted on a respective pair of road wheels, the two frames being pivotally connected together about a generally vertical axis of articulation for the purpose of steering the vehicle. Such vehicles are commonly used in the logging industry.

To steer the vehicle the angle between the frames at the axis is varied in a controlled manner. A common way of achieving this control is to use a hydraulic piston and cylinder assembly, the cylinder being double-acting and being pivotally secured to one frame, while the remote end of the piston is connected to the other frame. The line of action of this steering assembly is displaced laterally from the axis of articulation, so that expansion or contraction of the steering assembly will have the desired steering effect. In some installations two such piston and cylinder assemblies may be employed. The supply of hydraulic fluid to the cylinder or cylinders is under the control of one or more steering valves. Such valves means is typically provided with a control level or steering wheel which the operator moves in one direction to modify the frame angle to steer more to the right and in the other direction to modify the frame angle to steer more to the left. When centered, the lever or wheel will neither supply fluid to each hydraulic cylinder nor allow the escape of any fluid therefrom, so that the frame angle whatever it may be will remain unchanged. Thus, if the operator moves his steering lever or wheel into a first position and leaves it in this position (or in the case of a spring-centered lever or wheel, holds it in such position), the angle between the center-lines of the frame will continue to diminish on one side of the vehicle and the vehicle will steer more and more to that side. Obviously, this articulation movement cannot be permitted to continue indefinitely, and for this reason it is customary to provide fixed stops on the frames to limit the steering movement. Typically, such stops might be located so as not to allow the angle between the center-lines of the frames to be reduced on either side to less than a value somewhere within the range of about 130° to 140°.

While such stops generally operate satisfactorily to limit the degree of articulation of the vehicle, they have the disadvantage that a substantial shock occurs each time the stops engage each other. Considerable effort has been given to the development of stops that would cushion the impact. Ruber pads, springs and hydraulic cushions have been tried, but none have proved fully satisfactory, apart from the fact that they add considerably to the cost of manufacturing the vehicle. In addition the shock has undesirable effects on the hydraulic system, as will be more fully explained below.

The object of the present invention is to avoid this shock and, as a result, both to add to operator comfort and generally to increase the life of certain critical parts of the machine, particularly the hinge pins and their bearings. Avoidance of shock would also have the effect that hydraulic pressure surges would be reduced, which in turn would tend to reduce wear on the relief valves and the hydraulic system generally, in a manner that will also be more fully explained below.

In addition, the installation and alignment of the comparatively heavy mechanical stops that have been needed is a costly and time consuming item in the manufacture of a vehicle of this type, and a further object of the invention is the elimination or simplification of these stops.

Another problem encountered with conventional systems is that operators do not always center the steering control when the stops make contact. To provide for this contingency, it is conventional to provide the hydraulic system with relief valves which blow off if the valve is held in one of the steering positions after the stops have engaged. Such a blow-off action may, however, typically represent the dissipation of twenty to thirty horsepower, which energy has to be absorbed as heat in the hydraulic oil. Therefore, such a blow-off action if prolonged, subjects the hydraulic system to very severe service, more specifically, excess heating. Another object of the invention is the avoidance of this disadvantage.

To this end the invention in its preferred form consists of means for sensing reduction of the frame angle, i.e. the angle between the frame center-lines on either side of the vehicle, to a predetermined value (namely the minimum values, say 135°, which corresponds to the maximum steering angle desired, e.g. 45°), such sensing means being connected to the steering valve means so as in effect to center the same, as soon as this predetermined frame angle has been reached, thus preventing any further reduction of such frame angle. While in the preferred form of the invention the sensing means is combined with a steering mechanism of the type having at least one hydraulic cylinder and a hydraulic control valve, it will be apparent that, in its broad scope, the invention is also applicable to other forms of steering mechanism. The essence of the invention is to eliminate the shock of checking the frame steering movement by stops, and indeed normally to eliminate the need for these stops altogether.

In the preferred form of the invention, the sensing mechanism takes the form of a pair of rods slidingly mounted parallel to each other on the frame on which the steering valve is mounted and arranged to project towards a plate on the other frame. This plate is so shaped that, as the frames pivot relative each other, the plate eventually comes to bear against the rod on the side to which the vehicle is turning. This action, which becomes fully effective only as the frames near their maximum turning position, causes the acted-upon rod to be moved relative to its mounting. This rod movement is transmitted to the control valve system to center the same, thus stopping further relative turning of the frames. This action can be made to take place gradually over the last few degrees of turning of the vehicle frames, so that no sudden change of hydraulic conditions and no sudden and positive mechanical arresting of the turning movement occurs, merely a smooth deceleration. Since the rod movement actually returns the valve to its central position, the operator is unable to hold the valve in, or move it towards, a position that would continue to increase the frame turning action in the same direction.

Another advantage of the present invention arises in connection with the effect of the vehicle striking an obstacle. For example, assume that one end of a bulldozer blade fitted to the front of the vehicle strikes an obstacle when the vehicle is in the maximum turned condition, the end of the blade engaging the obstacle being such as to tend to increase the turning angle (i.e. decrease the angle between frame center-lines). With the conventional stops no cushioning is available and a severe shock effect is suffered. However, with the present invention, a cushioning effect is available, since it is usual to provide relief valves in the hydraulic system, that will allow the steering cylinder to yield somewhat, and there are no stops to place an absolute limit on the turning angle. In the absence of positive stops, the vehicle is free to oversteer a few degrees in response to this type of mechanical shock load. Such oversteering will still further deflect the sensing rod, which will then act on the control valve to correct the oversteering.

It is believed that the various features and advantages of the invention will be better appreciated from the accompanying drawings which illustrate various forms thereof, it being understood that the features of the machine illustrated are shown by way of example and not of limitation, the broad scope of the invention being defined in the appended claims. In the drawings:

Figure 1:
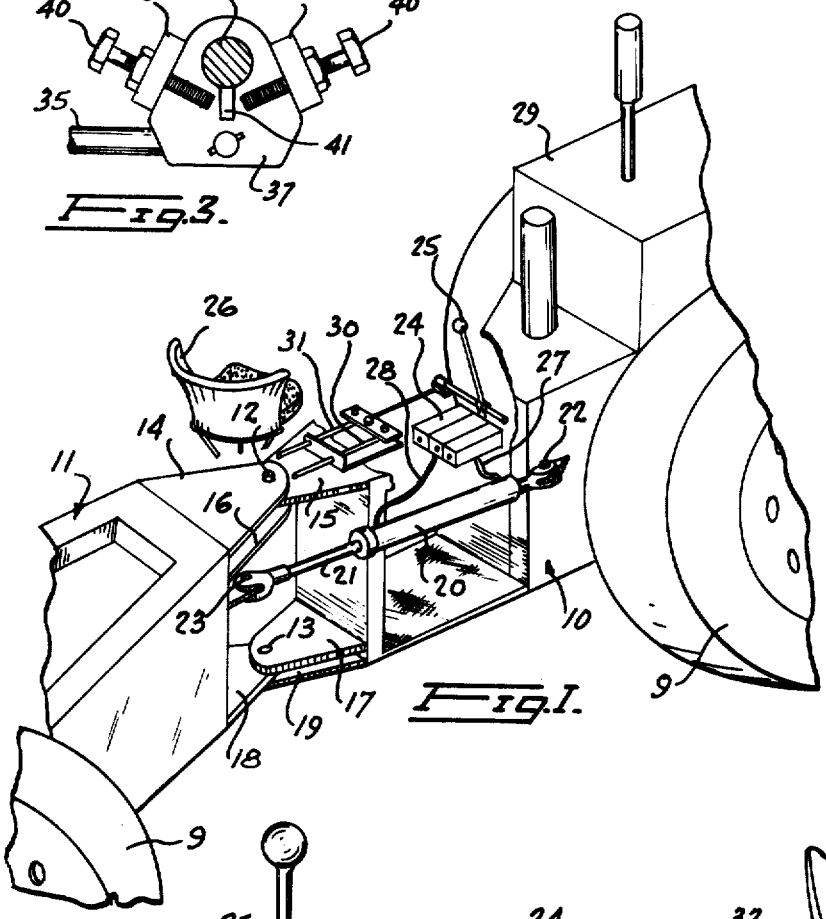
FIGURE 1 shows a fragmentary perspective view of an articulated vehicle modified in accordance with the invention.

The vehicle shown fragmentarily in FIGURE 1 comprises a front frame 10 and a rear frame 11 joined together by pins 12 and 13 which serve to articulate frame members 14, 15, 16 and 17, 18, 19 together. Both frames have a pair of road wheels 9. The steering assembly is shown simply as a double-acting cylinder 20 and piston 21, pivotally connected by pins 22 and 23 to the respective frames. Steering control valve 24 is operated by a lever 25 by an operator who occupies seat 26. Many other conventional parts, including casing members, have been omitted for clarity. Hydraulic hoses 27 and 28 extend to the cylinder 20, and a source of hydraulic pressure associated with the engine 29 is conveyed to the valve 24 by conduits that are not shown. The parts so far described are conventional.

Figure 3:
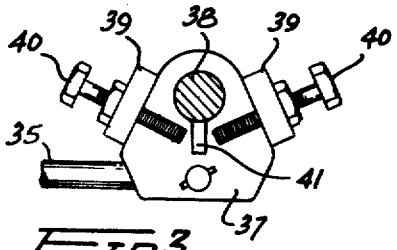
FIGURE 3 is a section on III—III in FIGURE 2.
Figure 2:
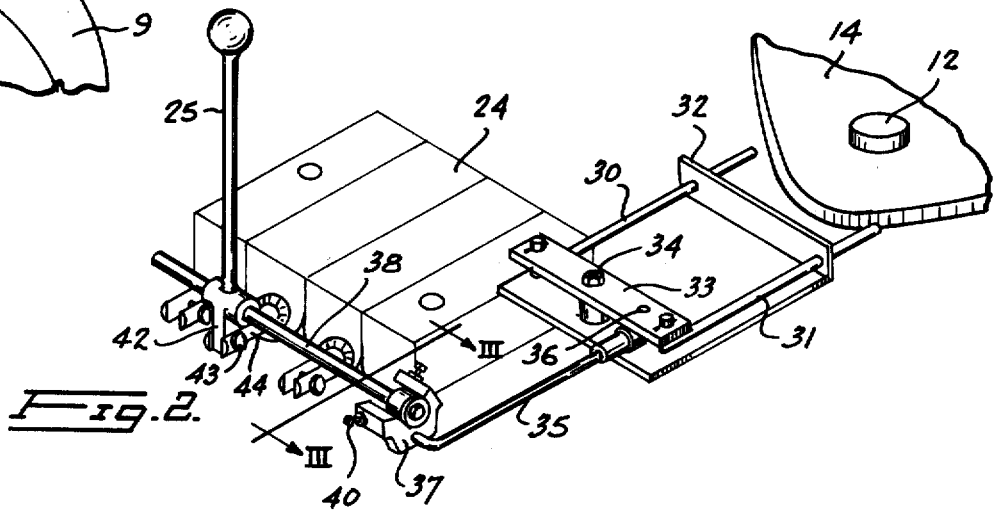
FIGURE 2 is a larger scale perspective view of the sensing mechanism of FIGURE 1.

The sensing mechanism is better seen from FIGURE 2 and comprises a pair of detector rods 30 and 31 slidingly mounted in a bracket 32 which is secured to the front vehicle frame 10. The free ends of the rods 30, 31 project towards the plate 14 for cooperation therewith, while their other ends are pivotally connected to respective ends of a rocking bar 33 that is centrally pivotally mounted at 34 on the bracket 32. Movement of the bar 33 is detected by a third rod 35 which is pivoted at one end to the bar 33 at 36. The other end of the rod 35 engages pivotally in a plate 37 (see also FIGURE 3) which is freely pivotally mounted at the end of a shaft 38. The plate 37 includes lugs 39 bearing adjustable screws 40, the inner ends of which screws project towards a projection 41 secured to the shaft 38. In this way, sliding movement of the rod 35 is translated into rotational movement of the shaft 38, with a lost motion the amount of which depends on the setting of the screws 40.

The steering lever 25 is secured to the shaft 38 to turn with it, and a downward forked projection 42 (FIGURE 5) from the lever 25 engages a pin 43 at the end of a spool 44 of the control valve 24.

Figure 4C:
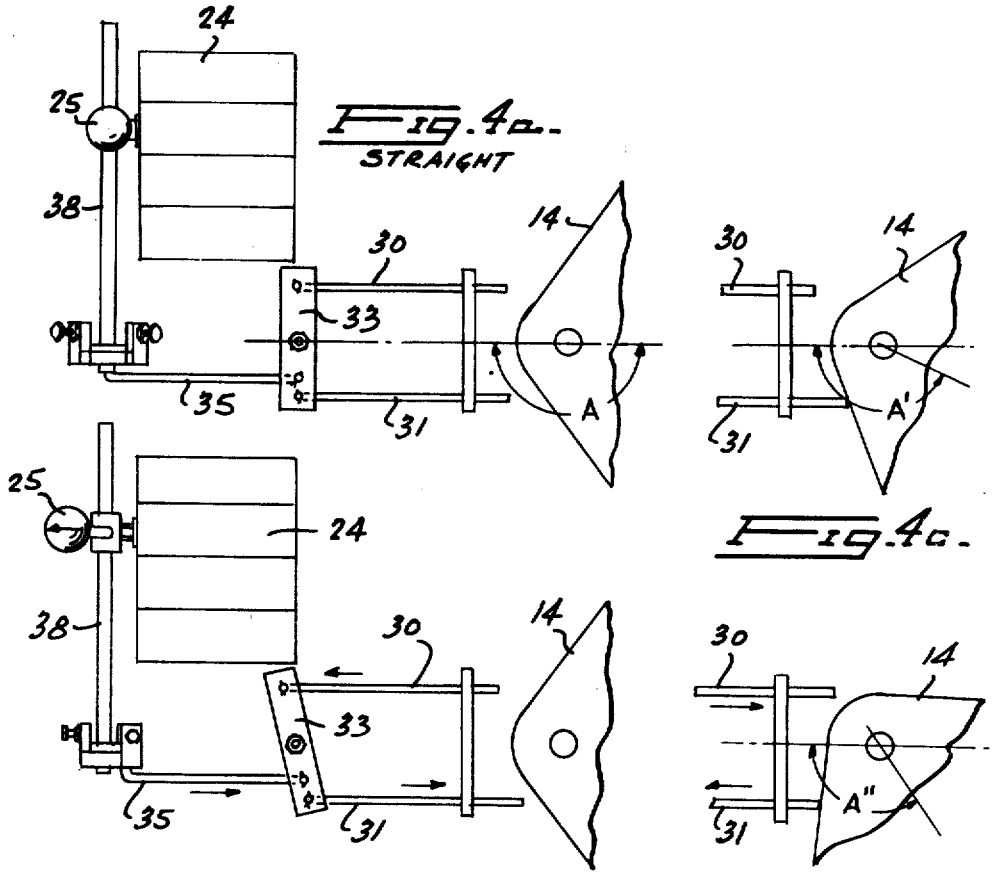
FIGURES 4a and 4d are diagrammatic plan views of FIGURE 2, showing various positions.

FIGURE 4a shows conditions with the vehicle in condition for straight travel, i.e. the angle A between frames at 180°, and with the valve lever 25 in central position. FIGURE 4b shows the lever 25 pushed forward for steering left, which action, after the lost motion has been absorbed, moves the left hand rod 31 rearwardly towards, but not into engagement with, the plate 14. As the steering cylinder 20 turns the frames in response to the control valve 24 (FIGURE 4c), the plate 4 contacts the rod 31 at a frame angle A′. Continued turning to the left results in the rod 31 being pushed back towards its original position by the plate 14. FIGURE 4d shows the "steering checked" condition, for which purpose the rod 31 has been moved back by the plate 14 slightly beyond its original position, in order to center the valve 24, having regard to the lost motion. The frames now define their minimum angle A″ (say 135°). This frame angle is the minimum normally achieved, except for any temporary further reduction in the value of this angle that may take the form of forced oversteering, resulting from the vehicle striking an obstacle. Such oversteering will cause movement of the valve 24 towards the "steer right" condition (corresponding to backward movement of the lever 25) to correct the oversteer.

It is believed that it will be evident that movement from the FIGURE 4c to the FIGURE 4d position (and indeed also any oversteer beyond the FIGURE 4d position) will cause gradual movement of the control valve and hence a steady change of condition with comparatively shockless arresting of the turning movement of the vehicle.

Figure 5:
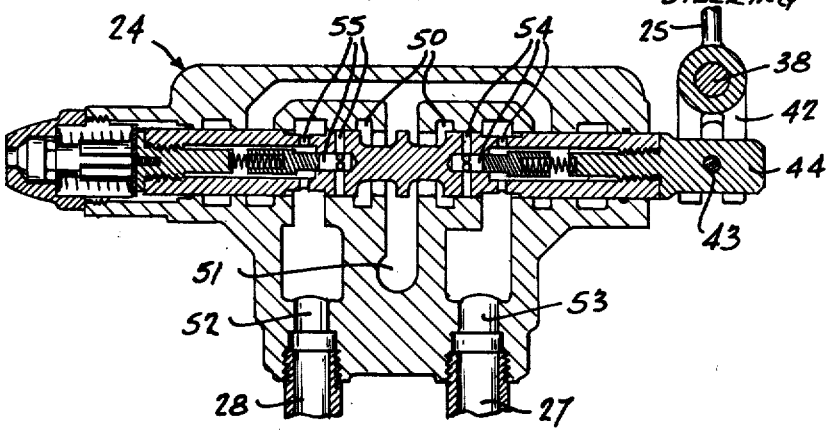
FIGURE 5 is a central section on the control valve used in FIGURES 1 to 4.

The control valve 24 is conventional, but for completeness has been shown in FIGURE 5, and will now be briefly described. Pressure hydraulic fluid is received from a pump at the engine in ports 50, while port 51 vents to the reservoir on the low pressure side of the pump. Outlet 52 connects to hose 28, outlet 53 to hose 27. For a left turn the spool 44 is removed to the left in FIGURE 5, allowing pressure fluid from the right hand port 50 to flow through passageways 54 to outlet 53 and thence through hose 27 to expand the cylinder 20. At the same time the other end of the cylinder 20 is allowed to vent through hose 28, outlet 52 and passageways 55 to port 51. The reverse conditions apply for a right turn. While the drawing shows a series valve with an open-centre circuit, there may with equal utility be used a pair of parallel valves with closed-centre circuits.

Figure 6:
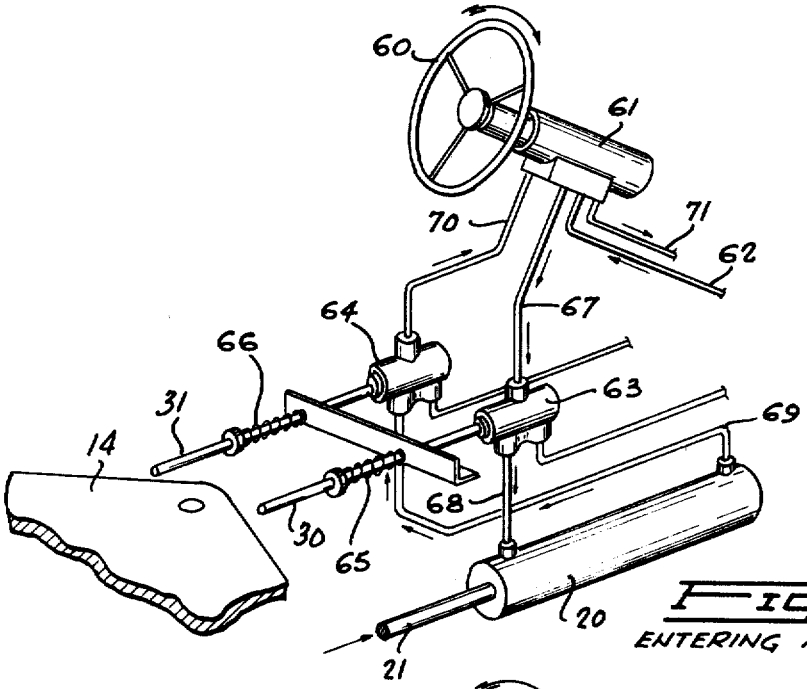
FIGURE 6 is a diagrammatic perspective view of an alternative embodiment of the invention in a first position.
Figure 7:
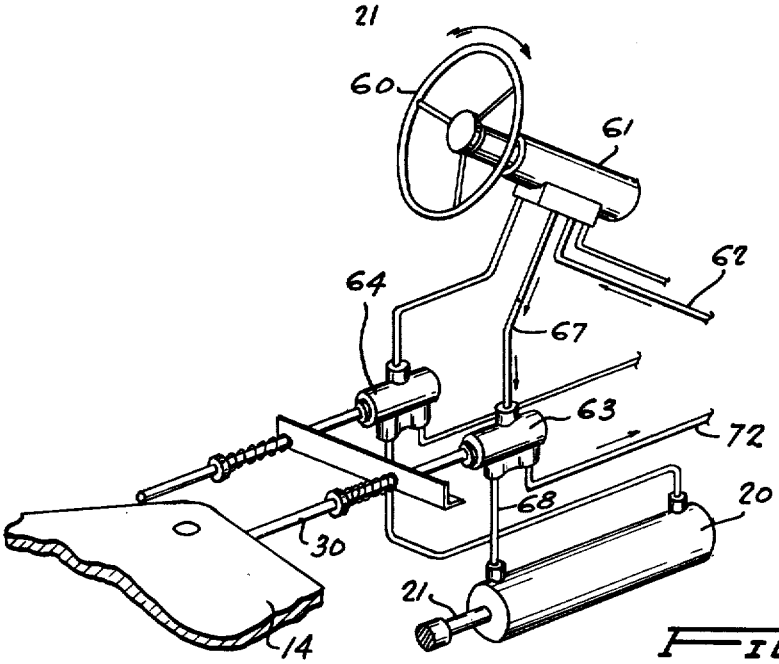
FIGURE 7 is a view similar to FIGURE 6 in a second position.

The second embodiment shown in FIGURES 6 and 7 employs a steering wheel 60 controlling a main hydraulic valve 61 to which fluid pressure from supply 62 can be directed to a selected one of a pair of diverter valves 63, 64 and hence to a respective end of the cylinder 20. Rods 30, 31 are provided, as before, for movement by the plate 14, although in this case each rod has an individual return spring 65, 66 and acts directly on a respective valve 63, 64.

FIGURE 6 shows conditions as a right turn is initiated. The wheel 60 is rotated clockwise to cause the valve 61 to admit pressure fluid from supply 62 through line 67, diverter valve 63 (still in normal position) and line 68, to one end of the cylinder 20 to steer the vehicle to the right. From its other end the cylinder will exhaust through line 69, valve 64, line 70, main valve 61 and line 71 to reservoir. FIGURE 7 shows conditions when the desired frame angle has been reached, plate 14 forcing rod 30 to actuate the valve 63 to divert the pressure fluid received from line 67 to line 72 which leads to the reservoir. With the parts in this position, no further steering effect is exercised on the cylinder 20, even though the wheel 60 may be held in the full right turn position. The position of the piston 21 in the cylinder 20 is maintained by the fact that no fluid can enter or leave the end of the cylinder 20 to which line 68 is connected, since the diverter valve 63 is now closed to that line.

Steering to the left will result in the application of fluid pressure to the cylinder 20 through lines 70 and 69, and diverter valve 64, with final release of such valve by the rod 31, in a manner analogous to that already described for a right turn.

We claim:

1. A vehicle comprising:

(a) two frames each including a pair of road wheels, (b) means pivotally interconnecting said frames about a generally vertical axis of articulation.

(c) means for steering the vehicle by varying the angle between the center-lines of said frames at said axis, (d) means for sensing reduction of said angle between the frames on either side of the vehicle to a predetermined value, (e) and means connected both to said sensing means and to said steering means for acting on said steering means to prevent the same reducing said angle below said predetermined value, and wherein (f) said sensing means comprises (i) plate secured to one frame, (ii) a bracket secured to the other frame, (iii) and a pair of rods slidingly mounted in said bracket to project towards respective surfaces of said plate means located on opposite sides of the vehicle, (g) said steering means comprises (iv) at least one fluid pressure operated double-acting cylinder and associated piston, said piston and cylinder being connected to respective frames at a location laterally displaced from said axis of articulation, (v) manually operable control valve means connected to said cylinder for selective operation of the same in either direction, and (h) said means (e) comprises (vi) means connected to said rods for detecting movement of either one of said rods by said plate means to an extent corresponding to reduction of said angle between the frames to said predetermined value on a respective side of the vehicle, (vii) and means connecting said means (vi) to said control valve means to move said valve means positively away from condition for steering in a respective direction, upon detection by said means (vi) of said predetermined value on the side of the vehicle to which said valve means was conditioned to steer.

2. A vehicle according to claim 1, including means for interposing an adjustable amount of lost motion in said means (vii).

3. A vehicle comprising:

(a) two frames each including a pair of road wheels, (b) means pivotally interconnecting said frames about a generally vertical axis of articulation, (c) means for steering the vehicle by varying the angle between the center-lines of said frames at said axis, (d) means for sensing reduction of said angle between the frames on either side of the vehicle to a predetermined value, (e) and means connected both to said sensing means and to said steering means for acting on said steering means to prevent the same reducing said angle below said predetermined value, and wherein (f) said sensing means comprises (i) plate means secured to one frame, (ii) a bracket secured to the other frame, (iii) and a pair of rods slidingly mounted in said bracket to project towards respective surfaces of said plate means located on opposite sides of the vehicle, (g) said steering means comprises (iv) at least one fluid pressure operated double-acting cylinder and associated piston, said piston and cylinder being connected to respective frames at a location laterally displaced from said axis or articulation, (v) manually operable control valve means connected to said cylinder for selective operation of the same in either direction, and (h) said means (e) comprises (vi) a pair of check valves each connected between a respective end of said cylinder and said control valve means for diverting pressure fluid from said cylinder upon actuation of the check valve, (vii) and means connecting said rods each to a respective one of said check valves for actuation of the latter upon movement of either one of said rods by said plate means to an extent corresponding to reduction of said angle between the frames to said predetermined value on a respective side of the vehicle.

*4. In a vehicle comprising:*

*(a) two frames each including a pair of road engaging wheels,*

*(b) means pivotally interconnecting said frames about a generally vertical axis of articulation,*

*(c) power means for rotating said frames to and from an extreme steering angle about said axis relatively to each other whereby to steer the vehicle, and*

*(d) control means movable to positions applying and discontinuing steering power to said power means; the improvement that comprises in combination*

*(e) an actuating member forming a part of said control means and movable to control normally the steering positions of said frames while said frames rotate through a major part of their extreme steering angle, and*

*(f) further means responsive to rotation of said frames for moving said control means when said frames rotate to a steering position beyond said major part of the extreme angle, and including a portion acting only when said frames so rotate for moving said control means to a position discontinuing the steering power, so as to reduce power loss due to extreme steering while permitting the actuating member its normal control of the steering positions of the frames.*

*5. In a vehicle comprising:*

*(a) two frames each including a pair of road engaging wheels,*

*(b) means pivotally interconnecting said frames about a generally vertical axis of articulation,*

*(c) power means for rotating said frames to and from an extreme steering angle about said axis relatively to each other whereby to steer the vehicle, and*

*(d) control means movable to positions applying and discontinuing steering power to said power means; the improvement that comprises in combination*

*(e) a manual steering handle forming a part of said control means and movable to control normally the the steering positions of said frames while rotating through a major part of their extreme steering angle,*

*(f) sensing means associated with said frames for offering a particular response only when said frames rotate to a steering position beyond said major part of the extreme angle, and*

*(g) connecting means through which said sensing means apply their particular response for moving said control means to a position discontinuing the application of steering power to said power means, so as to reduce power loss due to extreme steering*

*while permitting the steering handle its normal control of the steering positions of the frames.*

*6. The combination as set forth in claim 5, in which said power means include a hydraulic steering ram interconnecting the two vehicle frames, said control means comprising valve means that control fluid pressures directed to said ram, and said steering handle and said sensing means being connected each to a part of said valve means for moving that part of the valve means.*

*7. The combination as set forth in claim 6, in which said sensing means include a member mounted for movement on one of the vehicle frames and engaging said connecting means, and a portion of said member normally in spaced relation to the other of said frames and engaged by said other frame when the frames rotate beyond said substantial stering angle.*

References Cited

The following references, cited by the Examiner, are of record in the patented file of this patent or the original patent.

UNITED STATES PATENTS

| | | | |
|---|---|---|---|
| 2,614,644 | 10/1952 | Gustafson | 180—79.2 |
| 2,896,734 | 7/1959 | Toth | 180—79.2 |
| 3,312,301 | 4/1967 | Hagen | 180—79.2 |

BENJAMIN HERSH, Primary Examiner

J. A. PEKAR, Assistant Examiner

U.S. Cl. X.R.

60—52; 74—388